United States Patent [19]
Klein

[11] 4,217,625
[45] Aug. 12, 1980

[54] LIGHTED INSTRUMENT DIAL FACE DISPLAY
[75] Inventor: Herman C. Klein, Los Angeles, Calif.
[73] Assignee: McDonnell Douglas Corporation, Long Beach, Calif.
[21] Appl. No.: 955,471
[22] Filed: Oct. 27, 1978
[51] Int. Cl.² ............................................ G01D 11/28
[52] U.S. Cl. ...................................... 362/30; 362/29; 362/800
[58] Field of Search ............................ 362/29, 30, 800

[56] References Cited
U.S. PATENT DOCUMENTS
4,044,708  8/1977  Klein .................................. 362/29 X Primary Examiner—Stephen J. Lechert, Jr.
Attorney, Agent, or Firm—Max Geldin

[57] ABSTRACT

A front lighted display for an instrument dial face and pointer, including in combination with such dial face and pointer and according to one embodiment, a plurality of light emitting diodes (LED) positioned around the inner periphery of an LED mounting and directing light rays onto the dial face, a conically shaped reflector positioned to reflect light from the LEDs onto the dial face, a center disc reflector having an LED mounted thereon to enhance illumination of the pointer hub and center area of the dial face presentation, and an LED baffle ring preventing direct viewing of the diodes, and which can have a light reflecting inner surface to redirect light from the LEDs onto the surface of the dial face. According to another embodiment incorporating a digital readout presentation on the dial face, the LEDs are positioned and oriented around the outer periphery of a lighting head to make the light rays of each diode overlap and provide a uniformly lighted dial face presentation, without utilizing the conically shaped reflector of the first embodiment. In addition, LEDs are mounted behind a digital counter mask for illumination of the digital readout presentation.

21 Claims, 5 Drawing Figures

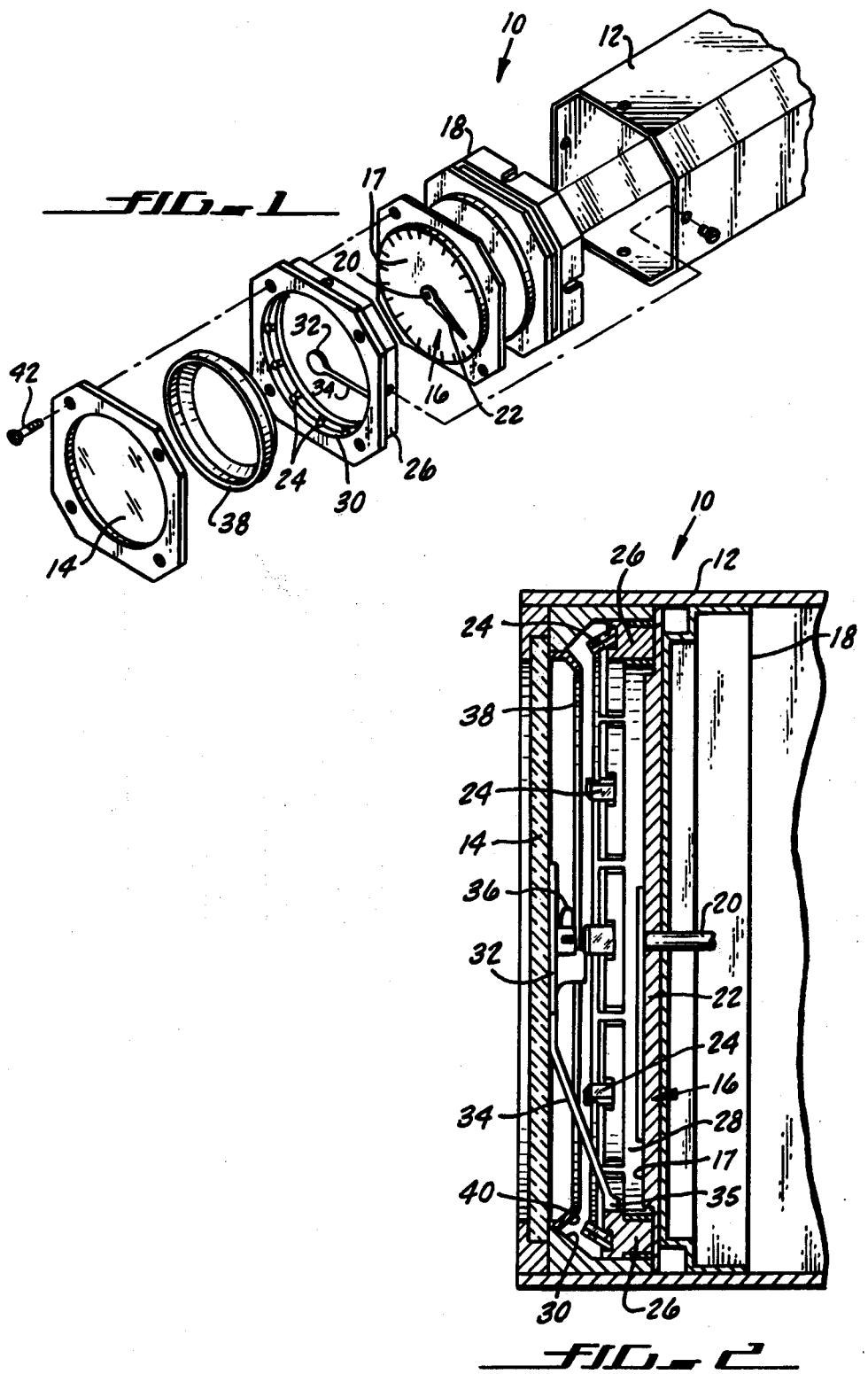

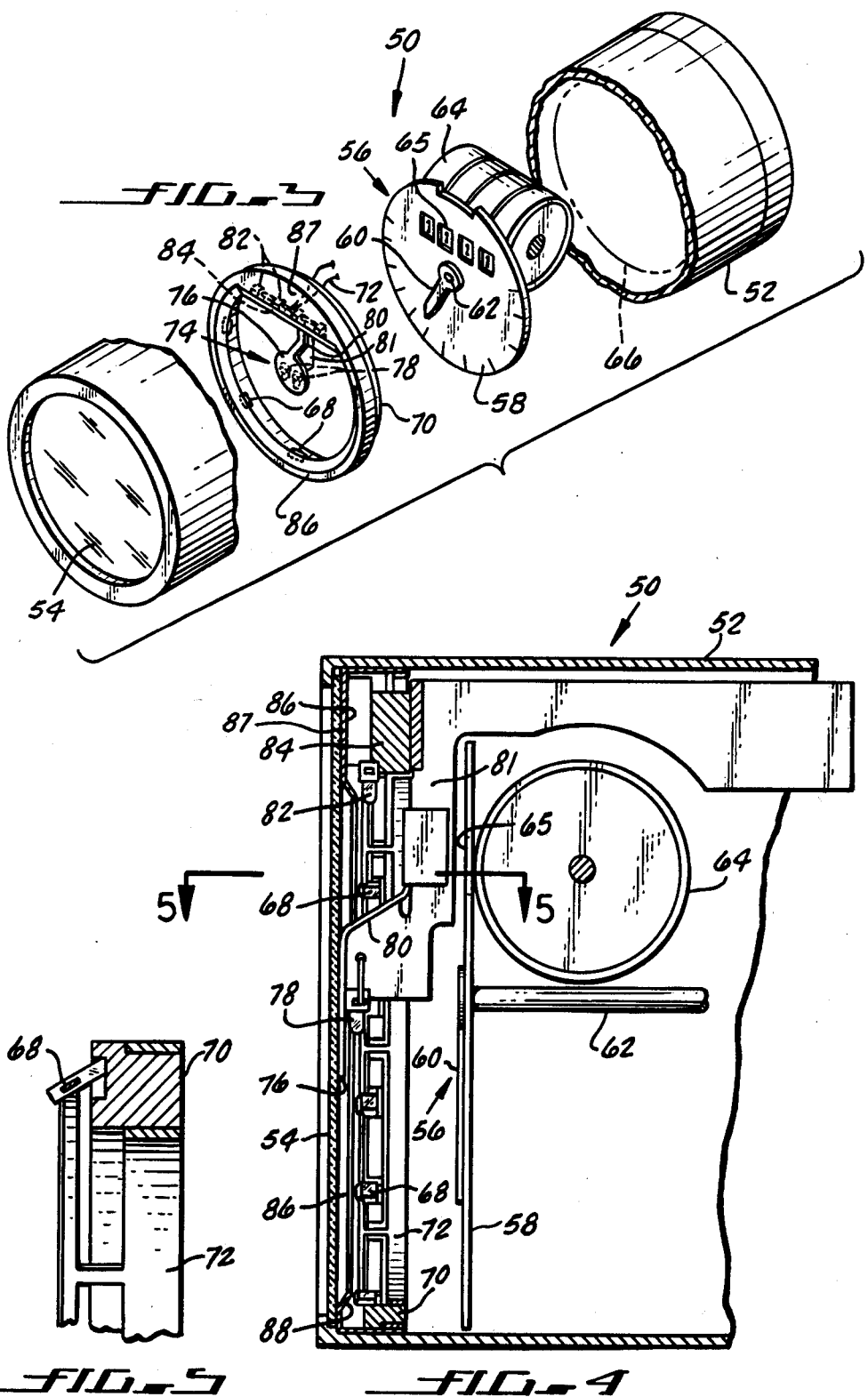

LIGHTED INSTRUMENT DIAL FACE DISPLAY

BACKGROUND OF THE INVENTION

The present invention is concerned with improved instrument lighting systems, and is particularly directed to the provision of simple indicator dial illuminating system for instruments employing light emitting diodes for illumination.

Incandescent lamps are usually employed to illuminate cockpit instrument displays, but these lamps generate a considerable amount of heat. This heat has often contributed to the premature failure of internal electronic components used in standard displays. In addition, incandescent lamps consume a great deal of power and are easily damaged by shock and vibration. Accordingly, a more effective, more reliable means of illumination is needed to solve the above problem, particularly in conjunction with an instrument dial display system which provides a high contrast ratio between the dial indicia and dial face background, and which causes the lighted dial indicia and pointer to exhibit a specified brilliance or lighted color presentation.

U.S. Pat. No. 3,732,560 discloses a rotatable drum indicator which uses light emitting diode back lighting, with the drum being molded from suitable near-transparent or highly translucent plastic material. However, the present dial and light-plate designs do not permit a satisfactory lighted display with light emitting diodes in that the white paint or white colored areas in the presently employed silk screen types of dial designs absorb or attenuate too much light and fail to provide a satisfactory lighting presentation with newly developed light sources, particularly light emitting diodes, and such light sources have a much lower intensity than incandescent lamps.

An improved illuminated dial face presentation system is disclosed in my U.S. Pat. No. 4,044,708, comprising a display of an instrument dial face, a light diffuser element, a high light transmission element mounted on the other side of the diffuser element from the instrument dial face display, light emitting diode means mounted in spaced relation to the light transmission element, and reflector means at the rear of the light transmission element for backlighting the instrument dial face display.

One object of the present invention is the provision of improved instrument dial face lighting systems, particularly for aircraft instruments. A further object is to provide simple lighting systems of the above type, utilizing a minimum number of elements and employing light emitting diodes effectively as a source of light, and which offer the advantages of long life, low power consumption and absence of internal heating. Yet another object is the provision of instrument dial face lighting systems, particularly for aircraft instruments, utilizing light emitting diodes as a light source, which provide illuminated dial face displays which satisfy commercial and military color and/or brightness requirements and which exhibit a uniform color and brightness presentation ranging from maximum illumination to brightness levels nearing extinction.

SUMMARY OF THE INVENTION

The above objects and advantages are achieved by the provision of a front lighted display system for an instrument dial face and pointer including in combination with such dial face a plurality of light emitting diodes mounted on and positioned around the periphery of a lighting head, a centrally mounted reflector incoporating light emitting diode means, and a baffle ring positioned in front of the diodes mounted around the periphery of the lighting head, to prevent direct viewing of such diodes, the inner surface of such baffle preferably being light reflecting to redirect light rays from the light emitting diodes onto the surface of the dial face. An instrument cover glass is positioned over the instrument lighting system.

According to one embodiment, a plurality of light emitting diodes (LED) is positioned around the inner periphery of an LED mounting in front of the instrument face, and directing light rays onto the dial face. A conically shaped reflector is positioned to reflect light rays from the light emitting diodes onto the dial face. A center disc reflector is provided having one or more light emitting diodes mounted thereon to enhance illumination of the pointer hub and center area of the dial face presentation. A baffle ring to prevent direct viewing of the diodes and which can have a light reflecting inner surface is provided to redirect light rays from the light emitting diodes mounted around the periphery of the lighting head, onto the surface of the dial face.

Thus a uniformly lighted dial face presentation is obtained from (a) the light rays of the respective diodes around the outer periphery adjacent the conical shaped reflector, (b) redirected light rays from the conical shaped reflector, (c) direct light rays from the center light emitting diode assembly, and (d) redirected light rays from the inner surface of the baffle ring.

According to another embodiment, the conical shaped reflector of the first embodiment is eliminated. In the present embodiment, the light emitting diodes are positioned and oriented around the outer periphery of a lighting head, so as to make the light rays of each diode overlap the light rays of the adjacent diodes and provide a uniformly lighted dial face presentation. In addition, light emitting diodes are mounted and positioned on a center disc reflector assembly, and additional light emitting diodes are mounted across a portion of the lighting head for illuminating a digital readout assembly on the dial face, which is driven by a digital counter. A light baffle is positioned over the light emitting diodes around the lighting head and a mask is provided to cover the light emitting diodes mounted across the lighting head.

THE DRAWINGS

The invention will be more clearly understood by reference to the detailed description below of certain preferred embodiments, taken in connection with the accompanying drawings wherein:

FIG. 1 is an exploded view of a front lighted display system for an instrument dial face according to one embodiment of the invention;

FIG. 2 is a sectional view of the assembly of the elements of FIG. 1;

FIG. 3 is an exploded view of a modification of the device of FIG. 1, omitting the conical shaped reflector of FIG. 1;

FIG. 4 is a longitudinal section of the assembly of the elements of FIG. 3; and

FIG. 5 is a partial section taken on line 5—5 of FIG. 4.

DETAILED DESCRIPTION OF PREFERRED EMBODIMENTS

Referring to FIGS. 1 and 2 of the drawing, there is shown a front lighted display system for an aircraft instrument, indicated at 10, comprising a polygonal, specifically an octagonal shaped cover case 12 and an instrument cover glass 14, preferably having a reflection reducing coating thereon. Mounted within the instrument cover case 12 are the dial face and pointer display arrangement 16, comprising dial face 17 and pointer 22, behind which is positioned the electrical-electronic assembly, indicated at 18, for operating the shaft 20 of the pointer 22 of the dial face and pointer display 16.

A plurality of light emitting diodes 24 are mounted in equally spaced relation around the inner periphery of a mounting member 26 which contains the wiring assembly, generally indicated at 28, for the respective light emitting diodes (LEDs). The lenses of the light emitting diodes 24 around the periphery of the mounting member 26 preferably are tilted or positioned at an approximate 30° angle inwardly toward the axis of the dial face and pointer display 16, as seen in FIG. 2, and are pointed toward a cup shaped or conical reflector 30 mounted in front of and closely adjacent the assembly of light emitting diodes 24 and mounting member 26, the reflecting surface of such reflector being disposed at a 45° angle.

An LED center disc reflector 32 is positioned centrally or axially of the shaft 20 of the dial face pointer 22, and is mounted in front of the peripherally positioned diodes 24 on an arm 34 which is suitably connected at its outer end 35 to the mounting member 26. Positioned on the center disc reflector 32 and in axial alignment with the pointer hub or shaft 20 is a light emitting diode 36 which is employed to further improve the illumination of the dial face and pointer display 16 adjacent the pointer hub 20 and the center area of the dial face presentation.

A baffle ring 38 is mounted around the conical reflector 30 and in front of the light emitting diodes 24 on the mounting member 26. The baffle 38 can be provided on its inner surface adjacent the light emitting diodes 24, with a reflective coating, indicated at 40. The baffle ring 38 prevents a direct viewing of the diodes 24 around the conical reflector 30, and the reflective coating 40 on the inner surface of the baffle ring advantageously redirects light emitted from the light emitting diodes 24 to the surface of the dial face and pointer display 16.

The various elements 16, 18, 26, 30, 38 and 14 are assembled in the instrument cover case 10 by suitable means such as the screws 42.

The front lighted display arrangement illustrated in FIGS. 1 and 2 provides uniform lighting of the dial face and pointer display 16 by direct light rays emitted from the respective diodes 24 around the periphery of the mounting member 26, by light rays from the light emitting diodes 24 which are redirected or reflected from the conical shaped reflector 30, by direct light rays from the centrally positioned light emitting diode 36, and by indirect light rays from diode 36 which are reflected from the center disc reflector 32 and redirected to the center of dial face and pointer display 16.

Referring now to FIGS. 3 and 4 of the drawing, there is shown a modification of the device of FIGS. 1 and 2. In FIGS. 3 and 4, illustrating another front lighted display for an instrument dial face employed on an aircraft instrument, the instrument indicated at 50, comprises a circular instrument case or bezel 52 and a circular instrument cover glass 54 mounted thereon. Within the instrument there is assembled an indicator faceplate and display presentation 56 comprising a dial face 58, a pointer 60 and pointer hub 62. A digital counter 64 is mounted behind the upper portion of the dial face 58, and is connected to a digital readout presentation 65 provided in the upper portion of dial face 58.

Behind the face plate display presentation 56 there is provided an electrical and mechanical assembly, indicated at 66, for operating dial pointer 60 and the digital counter 64.

A plurality of light emitting diodes 68 are mounted in equally spaced relation around the periphery of an optical lighting head 70, the number and orientation of such diodes around the lighting head, and the diodes arranged so that the light rays of each diode overlap one another and provide a uniformly lighted presentation of the indicator face plate 56, including the dial face 58 and pointer 60. This is accomplished preferably by grinding down and polishing the lenses of the diodes 68 to produce a wider light distribution pattern from each diode, resulting in uniform lighting particularly of the peripheral portion of the dial face 58, without requiring the conical reflector 30 of FIG. 1, even though the diodes 68 are positioned somewhat farther apart than the peripherally positioned diodes 24 in FIG. 1. Preferably the diodes 68 are tilted inwardly, e.g. at an angle of about 30°, toward the axis of the dial face 58 and pointer hub 62, as more clearly shown in FIG. 5. An electrical network of lead wires, indicated at 72 are operatively connected to the light emitting diodes.

A center disc assembly 74 is provided including a center disc reflector 76 behind which are mounted a pair of light emitting diodes 78, mounted in substantial axial alignment with the pointer hub 62. The center disc reflector assembly 74 is mounted on an arm 80 which is suitably connected and mounted on the lighting head 70.

Mounted across the upper portion of the lighting head 70 essentially along a chord of the circular lighting head is a plurality, e.g. of about four, light emitting diodes 82 which are positioned opposite the digital counter 64 and digital readout presentation 65 on the face plate presentation 56. A structural member 84 is provided on the lighting head 70, on which the diodes 82 are mounted, and to which the arm 80 is connected, via member 81.

Positioned around and in front of the light emitting diodes 68 is a light baffle ring 86 which masks and prevents viewing of the peripherally mounted light emitting diodes 68. The baffle ring 86 carries a chordal mask portion 87 which covers and prevents viewing of the diodes 82 on the lighting head 70. The rear surface of such light baffle 86, and including the rear surface of mask portion 87, can be provided with a reflective coating, as indicated at 88, to redirect or reflect indirect light rays from the light emitting diodes 68 and 82 onto the dial face presentation 56 and digital readout presentation 65.

It is accordingly seen that clear uniform illumination of the dial face presentation 56, including the dial face 58 and pointer 60 is provided by the direct light rays from the respective peripherally mounted diodes 68, the redirected light rays from the reflective surface 88 of baffle ring 86, the direct light rays from the centrally mounted diodes 78 and the indirect light rays from the center disc reflector 76; and digital readout presentation 65 of counter 64 is uniformly illuminated by the direct light rays from the light emitting diodes 82, and also by redirected light rays from the reflective inner surface 88 of mask portion 87 of baffle ring 86.

As previously noted, any light emitting diodes can be employed in the invention system to provide a predetermined luminous intensity at diode nominal forward currents ranging from about 10 to about 40 milliamperes, and forward voltages ranging from about 1.5 to about 3.0 volts, and any colors such as red, green and yellow light emitting diodes can be selected to provide contrasting lighted displays of the dial face and pointer presentations. Since such light emitting diodes are commercially available and are well known, details of their structure which form no part of the present invention, are not given herein.

Red and yellow LED displays have been developed with nominal brightness presentations of one and two foot-lamberts respectively. These displays exhibited a uniform color and brightness presentation from extinguish to maximum light intensity and offered a full readability of the dial face indicia and pointer presentation at extremely low light intensities near extinction. The LEDs, which are basically monochromatic light sources, allowed the display to present the same color response to the eye at any illumination level in a low ambient light environment. With an integrally lighted incandescent system, the dial presentation will vary and produce darker colors at lower brightness settings.

The front lighted dial face display systems of the invention can be used as front lighted displays for commercial or military aircraft flight compartment displays as well as automotive displays.

The light emitting diodes not only provide high intensity displays, but their reliability and long life, together with the fact that they operate cooler and consume much less power for a given amount of light than incandescent light sources, and their high immunity to damage from mechanical shock and vibration, are particularly advantageous over conventional incandescent lighting systems or integrally lighted displays of commercial and military aircraft.

From the foregoing, it is seen that the invention provides improved illuminated presentations or displays of the dial face and associated pointer, and other assemblies such as digital readout displays of digital counters, and especially adapted for aircraft instruments, employing light emitting diodes and the resultant advantages thereof, and utilizing a minimum of elements or components. With such device, a high contrast ratio can be achieved and a full reading of the dial presentation can be obtained in a high ambient lighting environment or with the lighting circuit almost de-energized.

While particular embodiments of the invention have been described for purposes of illustration, it will be understood that other variations and modifications of the invention will occur to those skilled in the art and the invention accordingly is not to be taken as limited except by the scope of the appended claims.

What is claimed is:

1. A front lighted display system for an instrument dial face and pointer, which comprises in combination with said dial face and pointer, a lighting head, a plurality of light emitting diodes positioned around the periphery of said lighting head and disposed to emit light rays directly onto said face, a reflector mounted centrally of said dial face, light emitting diode means positioned adjacent said reflector, said diode means emitting direct light rays onto the central portion of said dial face and said pointer, and said reflector redirecting reflected light rays from said diode means onto said central portion of said dial face and said pointer, and a baffle ring positioned in front of said peripherally mounted diodes to prevent direct viewing thereof.

2. The system as defined in claim 1, the inner surface of said baffle ring being light reflecting to redirect reflected rays from said diodes mounted on the periphery of said lighting head, to said dial face.

3. The system as defined in claim 1, said light emitting diode means positioned adjacent said reflector, comprising at least one light emitting diode.

4. The system as defined in claim 1, including a conically shaped reflector positioned around and in front of said peripherally positioned light emitting diodes, to redirect reflected light rays from said light emitting diodes to said dial face.

5. The system as defined in claim 4, the inner surface of said baffle ring being light reflecting to redirect reflected rays from said diodes positioned around the periphery of said lighting head, to said dial face.

6. The system as defined in claim 1, the light emitting diodes positioned around the periphery of said lighting head being tilted inwardly toward the axis of the dial face and pointer assembly.

7. The system as defined in claim 5, the light emitting diodes positioned around the periphery of said lighting head being tilted inwardly toward the axis of the dial face and pointer assembly.

8. The system as defined in claim 1, including a digital counter and a digital readout assembly for said counter positioned on said dial face, and additional diode means mounted on said lighting head for emitting light rays onto said digital readout assembly.

9. The system as defined in claim 8, said baffle ring being arranged also to prevent direct viewing of said additional diode means.

10. A front lighted system for uniformly illuminating an instrument including a dial face and pointer, which comprises in combination with said dial face and pointer, a lighting head mounted in front of said dial face, a plurality of light emitting diodes positioned around the periphery of said lighting head and disposed to emit light rays directly onto said dial face, a reflector mounted centrally in front of said dial face, means mounting said reflector on said lighting head, light emitting diode means mounted on said reflector, said diode means emitting direct light rays onto the central portion of said dial face and said pointer and said reflector redirecting reflected light rays from said diode means onto said central portion of said dial face and said pointer, a conically shaped reflector positioned around and in front of said peripherally positioned light emitting diodes to redirect reflected light rays from said light emitting diodes onto said dial face, and a baffle ring positioned in front of said peripherally mounted diodes to prevent direct viewing thereof.

11. The system as defined in claim 10, including a cover glass mounted in front of said baffle ring and said conically shaped reflector.

12. The system as defined in claim 11, said means mounting said first mentioned reflector centrally on said lighting head comprising an arm connected at one end to said last mentioned reflector and connected at its opposite end to said lighting head.

13. The system as defined in claim 12, said centrally mounted reflector being positioned in front of said light emitting diode means, said light emitting diode means comprising at least one light emitting diode.

14. The system as defined in claim 13, said light emitting diodes positioned around the periphery of said lighting head being tilted inwardly toward the axis of the dial face and pointer assembly.

15. A front lighted system for uniformly illuminating an instrument including a dial face and pointer, and a digital readout presentation of a digital counter, positioned across the upper portion of said dial face, which comprises in combination, a circular lighting head in front of said dial face, a plurality of light emitting diodes positioned around the periphery of said lighting head and arranged so that the light rays of each diode overlaps the light rays of adjacent diodes to provide a uniformly lighted dial face presentation, a reflector positioned in front of said dial face and centrally thereof, means mounting said reflector on said lighting head, light emitting diode means mounted on said reflector, a plurality of light emitting diodes mounted along a chord across said circular lighting head and positioned to emit light onto said digital readout presentation, a baffle ring positioned in front of said peripherally mounted diodes to prevent direct viewing thereof, and a mask positioned in front of said plurality of light emitting diodes and mounted along a chord of said lighting head, to prevent direct viewing of said last mentioned diodes.

16. The system as defined in claim 15, including a structural member connected to the upper portion of said circular lighting head, said plurality of light emitting diodes mounted along a chord of said circular lighting head, being connected to said structural member, said means mounting said reflector in front of said dial face comprising an arm, said arm connected at one end to said last mentioned reflector and connected at its opposite end to said structural member, and said mask being mounted on said baffle ring.

17. The system as defined in claim 15, including a cover glass mounted in front of said baffle ring and said conically shaped reflector.

18. The system as defined in claim 16, said centrally mounted reflector being positioned in front of said light emitting diode means, said light emitting diode means comprising at least one light emitting diode.

19. The system as defined in claim 18, the light emitting diodes positioned around the periphery of said lighting head being tilted inwardly toward the axis of the dial face and pointer assembly.

20. The system as defined in claim 13, said baffle ring having a light reflecting coating on the inner surface thereof to redirect reflected rays from said diodes mounted on the periphery of said lighting head, to said dial face.

21. The system as defined in claim 18, said baffle ring having a light reflecting coating on the inner surface thereof to redirect reflected rays from said diodes mounted on the periphery of said lighting head to said dial face.

* * * * *